United States Patent [19]

Sakamoto et al.

[11] Patent Number: 4,698,699
[45] Date of Patent: Oct. 6, 1987

[54] HEAD POSITIONING SIGNAL GENERATING APPARATUS WITH SIGNAL DURATION CONTROL

[75] Inventors: Hitoshi Sakamoto; Takayuki Okafuji, both of Kanagawa, Japan

[73] Assignee: Sony Corporation, Tokyo, Japan

[21] Appl. No.: 694,300

[22] Filed: Jan. 24, 1985

[30] Foreign Application Priority Data

Jan. 27, 1984 [JP] Japan ................................ 59-13910

[51] Int. Cl.$^4$ ...................... H04N 5/783; G11B 5/592
[52] U.S. Cl. .................................. 360/10.2; 360/10.3; 360/109; 360/77
[58] Field of Search ........................ 360/10.2, 10.3, 70, 360/DIG. 1, 75, 77, 109; 358/312

[56] References Cited

U.S. PATENT DOCUMENTS

| 4,143,405 | 3/1979 | Kubota | 360/DIG. 1 |
|---|---|---|---|
| 4,163,994 | 8/1979 | Sakamoto et al. | 360/70 |
| 4,172,265 | 10/1979 | Sakamoto et al. | 360/70 |
| 4,319,289 | 3/1982 | Ravizza | 360/77 |
| 4,356,522 | 10/1982 | Takano et al. | 360/77 |
| 4,370,685 | 1/1983 | Hosoi et al. | 360/10.2 |
| 4,420,778 | 12/1983 | Sakamoto | 360/10.2 |
| 4,471,392 | 9/1984 | Zorbalas | 360/77 |
| 4,513,334 | 4/1985 | Otsuka | 360/77 |
| 4,550,351 | 10/1985 | Hamalainen | 360/10.2 |

Primary Examiner—Raymond F. Cardillo
Assistant Examiner—Robert A. Weinhardt
Attorney, Agent, or Firm—Lewis H. Eslinger; Alvin Sinderbrand

[57] ABSTRACT

A video signal reproducing apparatus comprises a rotary magnetic head which reproduces a video signal recorded on a magnetic tape, a rotator which rotates the rotary magnetic head to cause the same to scan the magnetic tape intermittently along a oblique path thereon, a head supporting member, such as a compound piezoelectric plate element, which supports the rotary magnetic head to rotate in accordance with the rotation of the rotator and to shift the position of the rotary magnetic head in the direction of the axis for rotation thereof in response to the level of a control signal supplied thereto, and a signal generator which produces a signal acting as the control signal in a "trick" reproducing mode and having such level variations as to cause the head supporting member to have a swinging movement in a period in which the rotary magnetic head is not in contact with the magnetic head, which affects to cancel a swinging movement of the head supporting member occuring in a period in which the rotary magnetic head scans the magnetic tape.

10 Claims, 18 Drawing Figures

FIG. 7A  T=0.6msec

FIG. 7B  T=0.7msec

FIG. 7C  T=0.8msec

FIG. 7D  T=0.9msec

FIG. 7E  T=1.0msec

HEAD POSITIONING SIGNAL GENERATING APPARATUS WITH SIGNAL DURATION CONTROL

BACKGROUND OF THE INVENTION

1. Field of the Invention

The present invention relates generally to an apparatus for magnetically reproducing a video signal, and more particularly, to a video signal reproducing apparatus having a rotary magnetic head making one turn thereof during one field period of a video signal treated thereby in contact with a magnetic tape in a normal operational mode thereof.

2. Description of the Prior Art

There has been proposed a video tape recorder (VTR) of the helical scan type having a rotary magnetic head which is rotated to make each one turn for scanning a magnetic tape during one field period of a video signal recorded thereby on or reproduced thereby from the magnetic tape in a recording or normal reproducing mode thereof. A typical example of a head drum arrangement employed in such a video tape recorder as mentioned above is shown in FIG. 1. In this example, a head drum 1 compose of a rotatable upper cylinder and a stationary lower cylinder (not shown), and a rotary magnetic head 2 is fixed to the bottom of the rotatable upper cylinder which faces to the top of the stationary lower cylinder. A magnetic tape 3 which is guided by a couple of guide pins 4 and 5 is wound around the head drum 1 to be obliquely scanned by the rotary magnetic head 2 when the latter is rotated in accordance with the rotation of the rotatable upper cylinder. In the recording or normal reproducing mode of the video tape recorder, the rotatable upper cylinder to which the rotary magnetic head 2 is fixed is rotated at such a rotating speed as to make each one turn during one field period of a video signal treated by the rotary magnetic head 2 in the direction shown with an arrow 6, and the magnetic tape 3 is transported in the direction shown with an arrow 7. Accordingly, in the recording mode, each segment of one field period of the video signal is recorded in a slant track formed on the magnetic tape 3 by one turn of the rotary magnetic head 2 except a part of the segment in a vertical blanking period of the video signal. Such a part of the segment which is not recorded on the magnetic tape 3 is caused during a short period in which the rotary magnetic head 2 does not come into contact with the magnetic tape 3.

Figure 2:
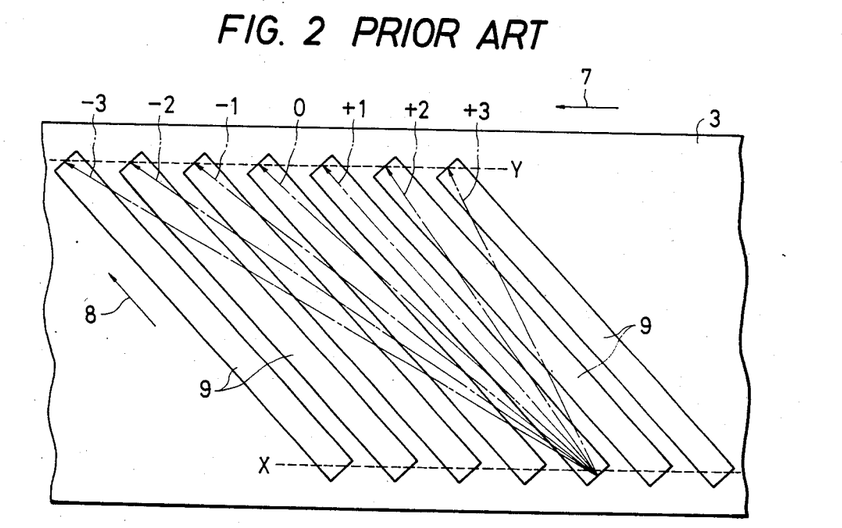
FIG. 2 is a illustration used for explaining traces of a rotary magnetic head on a magnetic tape in "trick" reproducing modes of a video tape recorder of the helical scan type.

When a so-called "trick" reproducing mode, such as, a fast-forward reproducing mode in which the magnetic tape 3 is advanced at a speed N (N is an integer) times as high as normal speed used for the recording or a normal reproducing mode, a still reproducing mode for obtaining a still reproduced picture, a reverse reproducing mode in which the magnetic tape 3 is reversed at the normal speed or a fast-reverse reproducing mode in which the magnetic tape 3 is reversed at the speed N times as high as the normal speed is taken in such a video tape recorder of the helical scan type as mentioned above, the scanning trace of the rotary magnetic head 2 on the magnetic tape 3 is not coincident with each of slant tracks formed on the magnetic tape 3 in the normal recording mode, as shown in FIG. 2. In FIG. 2, the magnetic tape 3 is provided with a plurality of slant tracks 9 formed in the recording mode of the video tape recorder wherein the magnetic tape 3 is advanced at the normal speed in the direction shown with the arrow 7 and the rotary magnetic head 2 is moved in the direction shown with an arrow 8. The scanning trace of the rotary magnetic head 2 in the normal reproduciing mode wherein the magnetic tape 3 is advanced at the normal speed is coincident with each slant track 9 as indicated by an arrow +1, but each of the scanning traces of the rotary magnetic head 2 in the "trick" reproducing modes intersects the slant tracks 9 in such a manner as indicated by an arrow +2 in a twice fast-forward mode wherein the magnetic tape 3 is advanced at a speed twice as high as the normal speed, by an arrow +3 in a three times fast-forward mode wherein the magnetic tape 3 is advanced at a speed three times as high as the normal speed, by an arrow 0 in the still reproducing mode, by an arrow −1 in the reverse reproducing mode, by an arrow −2 in a twice fast-reverse reproducing mode wherein the magnetic tape 3 is reversed at a speed twice as high as the normal speed and by an arrow −3 in a three times fast-reverse reproducing mode wherein the magnetic tape 3 is reversed at a speed three times as high as the normal speed.

In view of this, for the purpose of causing the scanning trace of a rotary magnetic head in the "trick" reproducing mode of a video tape recorder of the helical scan type to be coincident with each of selected slant tracks on a magnetic tape so that a reproduced video signal with reduced noise components, such as a video signal reproduced in the normal reproducing mode, is obtained, it has been proposed to mount the rotary magnetic head on a compound piezoelectric plate element which is composed of a couple of piezoelectric plate members bonded to each other with the common polarizing direction and fixed at one end thereof to a rotatable upper cylinder of a head drum so that the rotary magnetic head is rotated together with the rotatable upper cylinder and a position of the rotary magnetic head in the direction of the axis for rotation thereof is shifted in response to a voltage applied to the compound piezoelectric plate element and to supply to the compound piezoelectric plate element with a saw-toothed waveform voltage having a period corresponding to the period in which the rotary magnetic head makes one turn thereof in the "trick" reproducing mode, as disclosed in U.S. Pat. Nos. 4,287,538 or 4,319,289. In this proposal, the saw-toothed waveform voltage is selected to have the level increasing (or decreasing) with a first inclination determined in response to the direction and amount of the positional deviation of the scanning trace of the rotary magnetic head from each slant track on the magnetic tape, which is to be caused when any saw-toothed waveform voltage is not supplied to the compound piezoelectric plate element, in the period in which the rotary magnetic head scans the magnetic tape along the slant track from the beginning end to the terminal end thereof, and then, decreasing (or increasing) with a second inclination in the period wherein the rotary magnetic head is not in contact with the magnetic tape.

Figure 1:
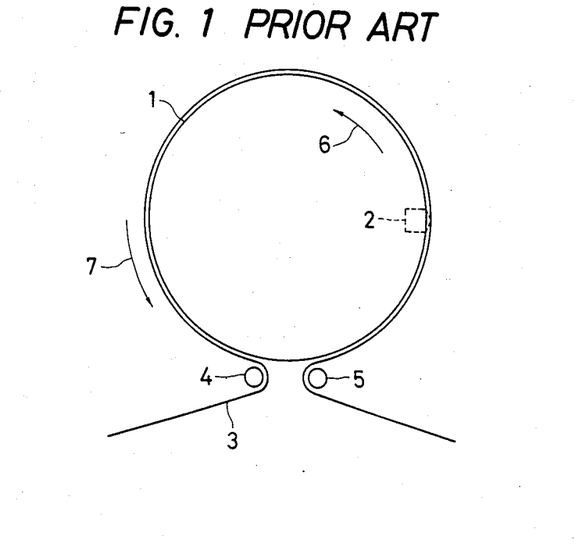
FIG. 1 is a schematic illustration showing an example of a head drum arrangement employed in a video tape recorder of the helical scan type.

In the case where this head control mechanism is employed in the video tape recorder of the helical scan type having such a head drum arrangement as shown in FIG. 1, since the rotary magnetic head must jump to a beginning position for slant tracks, such as indicated with X in FIG. 2, from a terminal position for slant tracks, such as indicated with Y in FIG. 2, on the magnetic tape in a period shorter than the vertical blanking period of the video signal in order to shift from a certain selected slant track to the next selected slant track, the saw-toothed waveform voltage supplied to the compound piezoelectric plate element is required to have a steep level inclination in the short period in which the rotary magnetic head jumps to the beginning position for slant tracks from the terminal position for slant tracks on the magnetic tape. Accordingly, as shown in FIG. 3A by way of example, a saw-toothed waveform voltage Es with a cyclical period corresponding to a field period of the video signal, which has a gently increasing slope during a period Px in which the rotary magnetic head scans the magnetic tape from the beginning position for slant tracks to the terminal position for slant tracks thereon and a steeply decreasing slope during a period Py in which the rotary magnetic head jumps from the terminal position for slant tracks to the beginning position for slant tracks on the magnetic tape is supplied to the compound piezoelectric plate element.

Figure 3A:
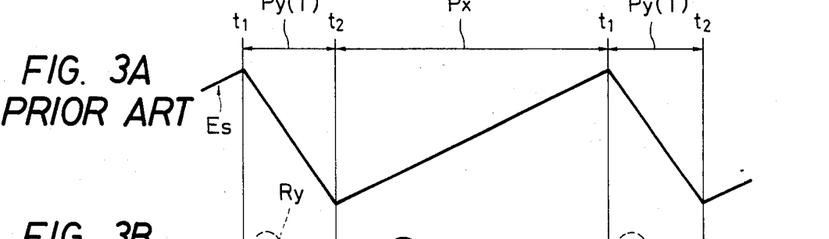
FIGS. 3A to 3C and FIG. 4 are waveform diagrams and a graphic illustration, respectively, used for explaining swinging movements of a rotary magnetic head mounted on a compound piezoelectric plate element in a previously proposed video tape recorder of the helical scan type.
Figures 3B, 3C:
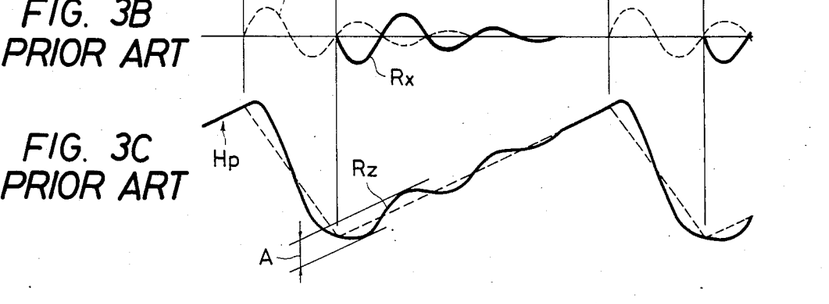

In such a case, however, as shown in FIG. 3B, swinging movements Ry and Rx of the compound piezoelectric plate element with a specific resonant frequency result from the changes of the slope of the saw-toothed waveform voltage Es occuring at a point $t_1$ at which the rotary magnetic head leaves the terminal position for slant tracks on the magnetic tape and a time point $t_2$ at which the rotary magnetic head enters the beginning position for slant tracks on the magnetic tape, respectively, and as a result of these swinging movements Ry and Rx, a residual swinging movement Rz of the compound piezoelectric plate element is caused at the beginning portion of the period Px as shown by means of a positional variation Hp of the rotary magnetic head in the direction of the axis for rotation thereof in FIG. 3C, so that the rotary magnetic head can not trace correctly the slant track on the rotary magnetic head. Such swinging movements occuring in connection with the rotary magnetic head is disclosed in detail in U.S. Pat. Nos. 4,163,994 or 4,172,265.

Further, in the case where, for the purpose of causing the rotary magnetic head to trace correctly slant tracks formed with inferior linearity on the magnetic tape, a sine-curve waveform voltage having a frequency higher than the field frequency of the video signal, for example, 720 Hz is also supplied to the compound piezoelectric plate element so as to cause the rotary magnetic head to vibrate in the direction of the axis for rotation thereof in accordance with a so-called "wobbling" method, such as disclosed, for example, in U.S. Pat. No. 4,404,605, a more undesirable movement of the rotary magnetic head may be caused by the beat arising between the vibration generated by the sine-curve waveform voltage and the swinging movement aforementioned.

Figure 4:
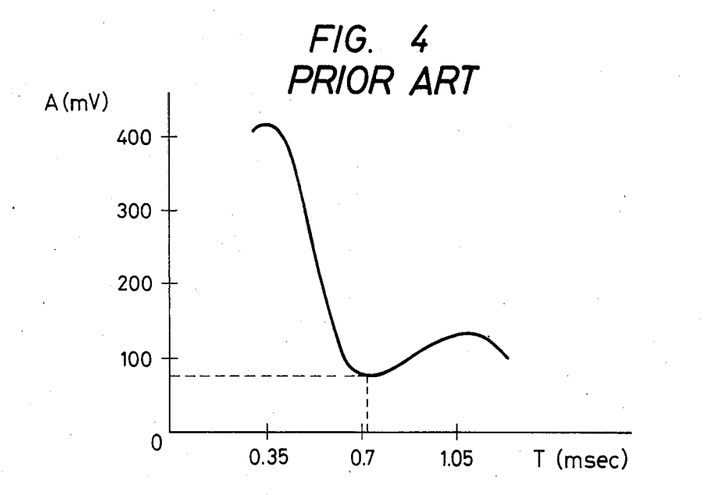

The magnitude of the residual swinging movement Rz of the compound piezoelectric plate element at the beginning portion of the period Px in which the rotary magnetic head scans the magnetic tape from the beginning position for slant tracks to the terminal position for slant tracks thereon, which is indicated with A in FIG. 3A, is varied remarkable in response to variations of the duration T of the period Py in which the rotary magnetic head jumps from the terminal position for slant tracks to the beginning position for slant tracks on the magnetic tape though it is also varies slightly in response to variations in amplitude of the saw-toothed waveform voltae Es. FIG. 4 shows an example of the relation between the magnitude A of the residual swinging movement Rz and the duration T of the period Py obtained practically under the condition where the frequency of the saw-toothed waveform voltage Es is 60 Hz, namely, the field frequency of the video signal, the amplitude of the saw-toothed waveform voltage Es is 250 volts and the specific resonant frequency of the compound piezoelectric plate element is 1425 Hz (the specific resonant period is 0.70 milliseconds). In FIG. 4, the magnitude A is referred to as a voltage value which is to be applied to the compound piezoelectric plate element for making the same have a deviation of the magnitude A in the static condition.

As apparent from the relation shown in FIG. 4, because the duration T of the period Py is long or the saw-toothed waveform voltage Es has a gentle slope during the period Py it does not always follow that the magnitude A of the residual swinging movement Rz is reduced, and in the condition wherein the duration T of the period Py is shorter than the vertical blanking period of the video signal, the magnitude A of the residual swinging movement Rz is minimized when the duration T of the period Py coincides substantially with the specific resonant period of the compound piezoelectric plate element. In the case of this example, the specific resonant period of the compound piezoelectric plate element is 0.70 milliseconds and it has been proven that the magnitude A of the residual swinging movement Rz is minimized at an equivalent voltage value of about 75 millivolts when the duration T of the period Py is about 0.72 milliseconds. This conclusion is explained as follows. In the case where the duration T of the period Py coincides substantially with the specific resonant period of the compound piezoelectric plate element, the swinging movement Ry of the compound piezoelectric plate element resulting from the change of the slope of the saw-toothed waveform voltage Es occurring at the time point $t_1$ at which the rotary magnetic head leaves the terminal position for slant tracks on the magnetic tape, as shown in FIG. 3B, is opposite in phase to the swinging movement Rx of the compound piezoelectric plate element resulting from the change of the slope of the saw-toothed waveform voltage Es occurring at the time point $t_2$ at which the rotary magnetic head enters the beginning position for slant tracks on the magnetic tape, as shown also in FIG. 3B, so that both swinging movements Ry and Rx partially cancel out each other.

In view of this, it is understood that the residual swinging movement Rz of the compound piezoelectric plate element can be minimized by setting the duration T of the period Py to be coincident with the specific resonant period of the compound piezoelectric plate element. However, in such a case, as apparent from the relation shown in FIG. 4, the minimized residual swinging movement Rz is still relatively large, because the swinging movement Ry of the compound piezoelectric plate element resulting from the change of the slope of the saw-toothed waveform voltage Es occuring at the time point $t_1$ decreases in the period Px to be insufficient for cancelling satisfactorily the swinging movement Rx of the compound piezoelectric plate element resulting from the change of the slope of the saw-toothed waveform voltage Es occuring at the time point $t_2$.

OBJECTS AND SUMMARY OF THE INVENTION

Accordingly, it is an object of the present invention to provide an apparatus for reproducing a video signal, which avoids inherent problems associated with the prior art.

Another object of the present invention is to provide an apparatus for reproducing a video signal having a rotary magnetic head provided for scanning a magnetic tape and mounted on a head supporting member, such as a compound piezoelectric plate element, for positional control in the direction of the axis for rotation thereof, which is capable of high quality reproducing of the video signal from the magnetic tape in a "trick" reproducing mode, for example, in the fast-forward or fast-reverse reproducing mode.

A further object of the present invention is to provide an apparatus for reproducing a video signal, as aforementioned, in which rotary magnetic head is controlled to trace correctly slant tracks formed on the magnetic tape in the "trick" reproducing mode.

A still further object of the present invention is to provide an apparatus for reproducing a video signal, as aforementioned, in which a control signal having an improved waveform is applied to the head supporting member to control the rotary magnetic head to take a proper position for tracing correctly slant tracks formed on the magnetic tape with sufficiently reduced swinging movement of the head supporting member in the "trick" reproducing mode.

Accordingly to an aspect of the present invention, there is provided a video signal reproducing apparatus comprising a rotary magnetic head for reproducing a video signal recorded on a magnetic tape; rotatable means, such as a head drum, for rotating the rotary magnetic head to scan the magnetic tape intermittently along an oblique path thereon; head supporting means, such as a compound piezoelectric plate element, for supporting the rotary magnetic head to rotate in accordance with the rotation of the rotatable means and to shift the position of the rotary magnetic head in the direction of the axis for rotation thereof in response to the level of a control signal supplied thereto; and signal generating means for producing a signal acting as the control signal in a "trick" reproducing mode and having a first level variation for causing the head supporting means to deviate the rotary magnetic head from a reference position in the direction of the axis for rotation thereof during a period in which the rotary magnetic head scans the magnetic tape and second and third level variations occuring successively for causing the head supporting means to bring back the rotary magnetic head to the reference position in the direction of the axis for rotation thereof during a period in which the rotary magnetic head is not in contact with the magnetic tape.

In the video signal reproducing apparatus thus constituted, the control signal applied to the head supporting means, which comprises, for example, the compound piezoelectric plate element, has the different level variations in first and second segmental periods successive for forming the period in which the rotary magnetic head is not in contact with the magnetic tape, respectively, in the "trick" reproducing mode, and as a result of such different level variations, a swinging movement of the head supporting means occuring in the period in which the rotary magnetic head is not in contact with the magnetic tape operates to cancel sufficiently a swinging movement of the head supporting means occuring in the period in which the rotary magnetic head scans the magnetic tape, so that the rotary magnetic head can trace correctly slant tracks on the magnetic tape in the "trick" reproducing mode.

The above, and other objects, features and advantages of the present invention will be apparent from the following detailed description which is to be read in conjunction with the accompanying drawings.

DESCRIPTION OF THE PREFERRED EMBODIMENT

Now, an embodiment of apparatus for reproducing a video signal according to the present invention will be described with reference to the accompanying drawings hereinafter.

Figure 5:
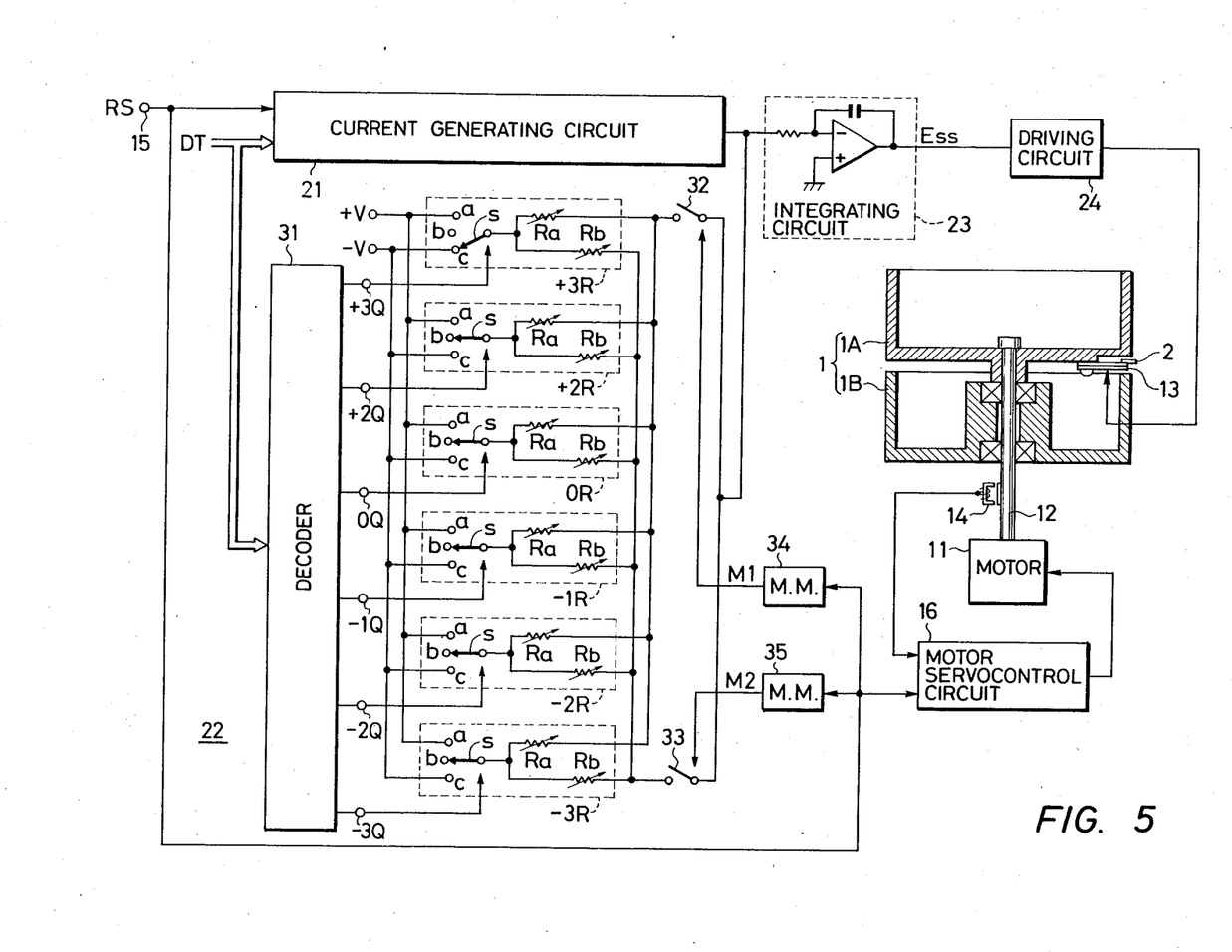
FIG. 5 is a schematic illustration showing one embodiment of apparatus for reproducing a video signal according to the present invention.

FIG. 5 shows an example of the apparatus for reproducing a video signal according to the present invention. This example is formed into a video tape recorder of the helical scan type having such a head drum arrangement as shown in FIG. 1.

In this example, the head drum 1 comprises an upper cylinder 1A and a lower cylinder 1B. The upper cylinder 1A is fixed on a rotating shaft 12 of a drum motor 11 so as to be rotated thereby, while the lower cylinder 1B is stationary to hold the rotating shaft 12 of the drum motor 11 to be rotatable. A compound piezoelectric plate element 13 which is formed of a couple of piezoelectric plate members bonded together is attached at one end thereof to the bottom of the upper cylinder 1A as a head supporting device for supporting a rotary magnetic head. The rotary magnetic head 2 is mounted on a free end of the compound piezoelectric plate element 13 to project slightly from the round surface of the head drum so as to shift in the direction of the axis for rotation thereof in response to variations in level of a voltage applied to the compound piezoelectric plate element 13. A magnetic tape (not shown in FIG. 1) is to be wound around the head drum 1 to be obliquely scanned by the rotary magnetic head 2 in the same manner as shown in FIG. 1.

A pulse generator 14 which produces a pulse whenever the rotary magnetic head 2 passes a predetermined position on the path of rotation thereof is provided on the rotating shaft 12 of the drum motor 11. In the recording mode, the pulses obtained from the pulse generator 14 and the vertical synchronous signal in a video signal recorded by the rotary magnetic head 2 on the magnetic tape are supplied to a motor servocontrol circuit (not shown in FIG. 1) to be compared in phase comparison is supplied to the drum motor 11 to control the rotation of the same, namely, the rotation of the rotary magnetic head 2 so that a period in which the rotary magnetic head 2 does not come into contact with the magnetic tape is included in the vertical blanking period of the video signal.

Figures 6A, 6B:
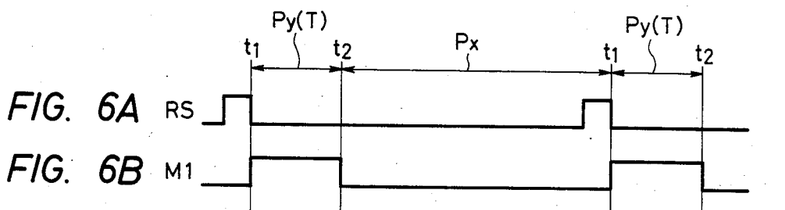
FIGS. 6A to 6F and FIGS. 7A to 7E are waveform diagrams and graphic illustrations, respectively, used for explaining swinging movements of a rotary magnetic head in the embodiment shown in FIG. 5.

In the "trick" reproducing mode, the pulses obtained from the pulse generator 14 and a reference synchronous signal RS supplied to a terminal 15, as shown in FIG. 6A, are supplied to a motor servocontrol circuit 16 to be compared in phase with each other. The output resulting from the phase comparison is supplied to the drum motor 11 to control the rotation of the same, namely, the rotation of the rotary magnetic head 2 so that the time point $t_1$ at which the rotary magnetic head 2 leaves the terminal position for slant tracks on the magnetic tape coincides with a time point of the falling edge of the reference synchronous signal RS, as shown in FIG. 6A.

In the reproducing mode, the reference synchronous signal RS obtained at the terminal 15 and an information signal for reproducing obtained by selecting the reproducing mode, that is, data DT commanding the direction and speed of tape movement are supplied to both current generating circuits 21 and 22. From the current generating circuit 21, a current which produces through integration in an integrating circuit 23 a portion Ex of a saw-toothed waveform voltage Ess shown in FIG. 6D and supplied to the compound piezoelectric plate element 13, which has an increasing slope during the period Px in which the rotary magnetic head 2 scans the magnetic tape from the beginning position for slant tracks to the terminal position for slant tracks thereon, is obtained, and from the current generating circuit 22, a current which produces through integration in the integrating circuit 23 portions Ea and Eb of the saw-toothed waveform voltage Ess, which have a steeply decreasing slope and a gently decreasing slope, respectively, during the period Py in which the rotary magnetic head 2 jumps from the terminal position for slant tracks to the beginning portion for slant tracks on the magnetic head, is obtained. These currents are integrated alternatively in the integrating circuit 23 to produce the saw-toothed waveform voltage Ess, and the saw-toothed waveform voltage Ess thus obtained is supplied through a driving circuit 24 to the compound piezoelectric plate element 13.

The current generating circuit 22 comprises a decoder 31, six resistant circuits +3R, +2R, 0R, −1R, −2R and −3R, a couple of switches 32 and 33, and a couple of monostable multivibrators (M.M.) 34 and 35. The decoder 31 is supplied with the date DT and produces a high level signal at one of output terminals +3Q, +2Q, 0Q, −1Q, −2Q and −3Q selected in accordance with one of the "trick" reproducing modes commanded by the data DT and chosen among the three times fast-forward reproducing mode, twice fast-forward reproducing mode, still reproducing mode, reverse reproducing mode, twice fast-reverse reproducing mode and three times fast-reverse reproducing mode.

Each of the resistant circuits +3R, +2R, 0R, −1R, −2R and −3R includes a pair of resistors Ra and Rb and a switch S having contacts a, b and c selectively connected with both one ends of the resistors Ra and Rb and controlled with the high level signal appearing at the corresponding one of the output terminals +3Q, +2Q, 0Q, −1Q, −2Q and −3Q of the decoder 31. The contacts a and c are supplied with positive and negative voltages +V and −V, respectively. The other ends of the resistors Ra in the resistant circuits +3R, +2R, 0R, −1R, −2R and −3R are coupled in common and connected through the switch 32 to the integrating circuit 23, and similarly the other ends of the resistors Rb in the resistant circuits +3R, +2R, 0R, −1R, −2R and −3R are coupled in common and connected through the switch 33 to the integrating circuit 23.

Figure 6C:
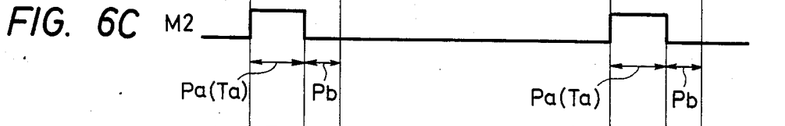

The monostable multivibrators 34 and 35 are supplied with the reference synchronous signal RS from the terminal 15 and triggered at the falling edge of the reference synchronous signal RS, namely, at the time point $t_1$ whereat the rotary magnetic head 2 leaves the terminal position for slant tracks on the magnetic tape so that output signals $M_1$ and $M_2$ rise simultaneously to a high level from a low level at the time point $t_1$, as shown in FIGS. 6B and 6C, respectively. The output signal $M_1$ of the monostable multivibrator 34 falls to the low level from the high level at the time point $t_2$ whereat the rotary magnetic head 2 comes into contact with the magnetic tape after a time corresponding to the duration T has elapsed, and the output signal $M_2$ of the monostable multivibrators 35 falls to the low level from the high level after a time corresponding to a duration Ta has elapsed. For example, the duration T is selected to be 0.8 milliseconds, as aforementioned, and the time and the duration Ta is selected to be 0.5 milliseconds.

The output signal $M_1$ of the monostable multivibrator 34 is supplied to the switch 32 as a switching control signal to cause the same to be turned on with the high level thereof, and similarly the output signal $M_2$ of the monostable multivibrator 35 is supplied to the switch 33 as a switching control signal to cause the same to be turned on with the high level thereof.

In the "trick" reproducing mode, for example, in the three times fast-forward reproducing mode, the high level signal appears at only the output terminal +3Q of the decoder 31 and therefore the switch S in the resistant circuit +3R is switched to select the contact c and each of the switches S in the resistant circuits +2R, 0R, −1R, −2R and −3R is switched to select the contact b. Accordingly, in a period Pa commencing from the time point $t_1$ with the duration Ta in which both output signals $M_1$ and $M_2$ of the monostable multivibrators 34 and 35 take the high level, a current flows from the input end of the integrating circuit 23 through both the resistors Ra and Rb in the resistant circuit +3R to the contact c of the switch S in the resistant circuit +3R to which the negative voltage −V is supplied, so that the output voltage of the integrating circuit 23 is steeply decreased to form the portion Ea of the saw-toothed waveform voltage Ess having the steeply decreasing slope. After that, in a period Pb successive to the period Pa in which only the output signal $M_1$ end of the integrating circuit 23 through the resistor Ra in the resistant circuit +3R to the contact c of the switch S, so that the output voltage of the integrating circuit 23 is gently decreased to form the portion Eb of the saw-toothed waveform voltage Ess having the gently decreasing slope.

Figure 6D:
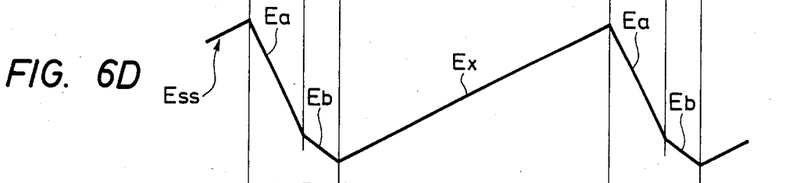

In such a manner as described above, the saw-toothed waveform voltage Ess supplied to the compound piezoelectric plate element 13 has the level decreasing with the steep slope during the period Pa including the beginning portion of the period Py and then decreasing further with the gentle slope during the period Pb including the end portion of the period Py, as shown in FIG. 6D, in the fast-forward reproducing mode in the example of the apparatus according to the present invention. With the saw-toothed waveform voltage Ess thus formed, the swinging movement Ry of the compound piezoelectric plate element 13, which results from the change of the slope of the saw-toothed waveform voltage Ess occuring at the time point $t_1$ at which the rotary magnetic head 2 leaves the terminal position for slant tracks on the magnetic tape, is increased so as to have the magnitude almost equal to the magnitude of and the phase opposite to the phase of the swinging movement Rx of the compound piezoelectric plate element 13, which results from the change of the slope of the saw-toothed waveform voltage Ess occuring at the time point $t_2$ at which the rotary magnetic head 2 enters the beginning position for slant tracks on the magnetic tape, as shown in FIG. 6E, in the period Px during which the rotary magnetic head 2 scans the magnetic tape with a approproately selected ratio of the duration Ta of the period Pa to the duration T of the period Py.

Figures 6E, 6F:
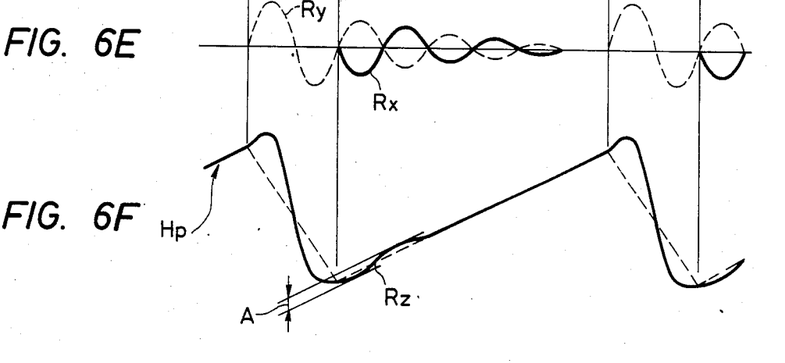
Figure 7A:
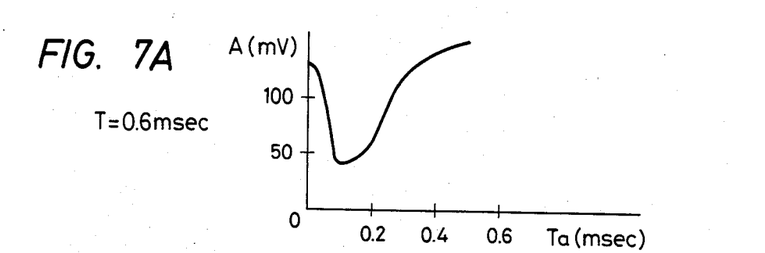
Figure 7B:
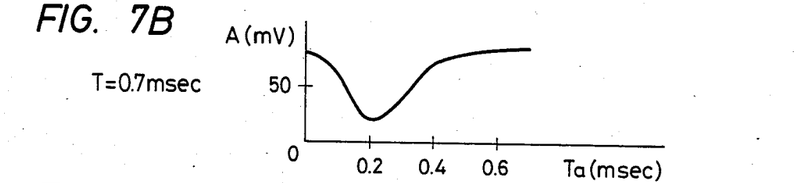
Figure 7C:
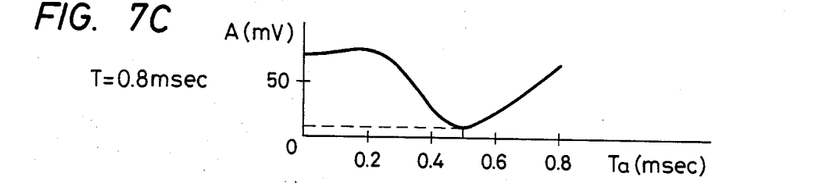
Figure 7D:
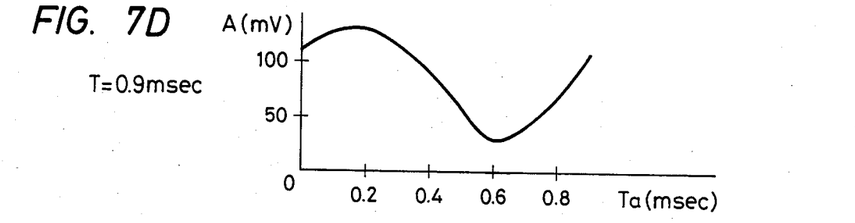
Figure 7E:
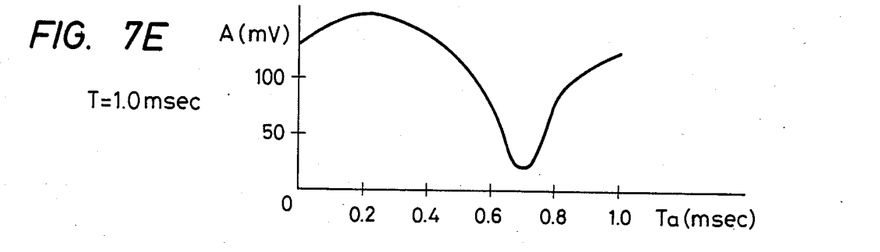

As a result of this, the swinging movements Ry and Rx of the compound piezoelectric plate element 13 are cancelled out by each other, so that the residual swinging movement of the compound piezoelectric plate element 13 caused in the period Px during which the rotary magnetic head 2 scans the magnetic tape is suppressed to have the magnitude A satisfactorily reduces as shown by means of the positional variation Hp of the rotary magnetic head 2 in the direction of the axis for rotation thereof in FIG. 6F. In a practical example, the duration Ta of the period Pa is selected to be equal to 50 to 80 percent of the duration T of the period Py, and the inclination in the period Pb is selected to correspond to 30 to 80 percent of that in the period Pa.

Each of FIGS. 7A to 7E shows the relation between the magnitude A of the residual swinging movement Rz and the duration Ta of the period Pa under the different duration T of the period Py, which is obtained practically in the condition where the frequency of the saw-toothed waveform voltage Ess is 60 Hz, the amplitude of the saw-toothed waveform voltage Ess is 250 volts and the specific resonant frequency of the compound piezoelectric plate element 13 is 1425 Hz (the specific resonant period is 0.7 milliseconds). In this case also, the magnitude A is referred to as a voltage value which is to be applied to the compound piezoelectric plate element 13 for making the same have a deviation of the magnitude A in the static condition.

As apparent from the relations shown in FIGS. 7A to 7E, in the case where the duration T is equal to or shorter than 0.8 milliseconds, the length of the duration Ta by which the residual swinging movement Rz is minimized is varied remarkable in response to variations in the duration T, and in the case where the duration T is longer than 0.8 milliseconds, the residual swinging movement Rz is relatively increased when the length of the duration Ta is deviated slightly from that by which the residual swinging movement Rz is minimized. Within the limits of these relations, it is most appropriate to select the duration T to be 0.8 milliseconds and the duration Ta to be about 0.5 milliseconds. In such a case, the residual swinging movement Rz is referred to as the equivalent voltage value of about 10 millivolts, which is reduced to correspond to one eighth of that in the case shown in FIG. 4.

Then, for example, in the three times fast-reverse reproducing mode, the high level signal appears at only the output terminal −3Q of the decoder 31 and therefore the switch S in the resistant circuit −3R is switched to select the contact a and each of the switches S in the resistant circuit +2R, oR, −1R, −2R and −3R is switched to select the contact b. Accordingly, in the period Pa commencing from the time point $t_1$ with the duration Ta, a current flows from the contact a of the switch S in the resistant circuit −3R to which the positive voltage +V is supplied through both the resistors Ra and Rb in the resistant circuit −3R to the input end of the integrating circuit 23, so that the output voltage of the integrating circuit 23 is steeply increased to form the portion Ea of the saw-toothed waveform voltage Ess having a steeply increasing slope. After that, in the period Pb successive to the period Pa, a current flows from the contact a of the switch S in the resistant circuit −3R through the resistor Ra in the resistant circuit −3R to the input end of the integrating circuit 23, so that the output voltage of the integrating circuit 23 is gently increased to form the portion Eb of the saw-toothed waveform voltage Ess having a gently increasing slope.

Further, in the still or reverse reproducing mode, the high level signal appears at only the output terminal 0Q or −1Q of the decoder 31 and therefore the switch S in the resistant circuit 0R or −1R is switched to select the contact a. Accordingly, in the same manner as the three times fast-reverse reproducing mode, the output voltage of the integrating circuit 23 is steeply increased to form the portion Ea of the saw-toothed waveform voltage Ess having a steeply increasing slope in the period Pa commencing from the time point $t_1$ with the duration Ta and gently increased to form the portion Eb of the saw-toothed waveform voltage Ess having a gently increasing slope in the period Pb successive to the period Pa.

Thus, the saw-toothed waveform voltage Ess supplied to the compound piezoelectric plate element 13 has the level increasing with the steep slope during the period Pa including the beginning portion of the period Py and then increasing further with the gentle slope during the period Pb including the end portion of the period Py in the fast-reverse, still or reverse reproducing mode in the example of the apparatus according to the present invention. As a result of this, the residual swinging movement Rz of the compound piezoelectric plate element 13 caused in the period Px during which the rotary magnetic head 2 scans the magnetic tpe is satisfactorily reduced in the same manner as mentioned above in connection with the fast-forward reproducing mode.

What is claimed is:
1. An apparatus for reproducing a video signal comprising:
rotary magnetic head means for reproducing a video signal recorded in slant tracks on a magnetic tape,
rotatable means for rotating said rotary magnetic head means to cause the same to scan the magnetic tape intermittently along the oblique path thereon,
head supporting means attached to said rotatable means for supporting said rotary magnetic head means to rotate in accordance with rotation of said rotatable means, said head supporting means being operative to cause a positional shift of said rotary magnetic head means in a direction of an axis of rotation thereof in response to the level of a control signal supplied thereto in selected reproducing mode of the apparatus, said head supporting means having a predetermined resonant frequency that causes it to undergo swinging movements upon changes in slope of said control signal, and signal generating means for producing said control signal in said selected reproducing mode and having a first level variation for causing said head supporting means to perform said positional shift for deviating the rotary magnetic head means from a reference position during a period in which said rotary magnetic head means scans the magnetic tape and having second and third level variations occurring successively for causing said head supporting means to perform said positional shift for bringing back said rotary magnetic head means to said reference position during a time in which said rotary magnetic head means is not in contact with the magnetic tape, said second level variation having steep slope relative to said third level variation and having a time duration substantially corresponding to a period of said resonant frequency of said head supporting means.

2. An apparatus according to claim 1, wherein said head supporting means comprises a compound piezoelectric plate element and said signal generating means comprises a circuit arrangement for producing a voltage having a periodic, saw-toothed waveform as said control signal and means for supplying said control signal to said compound piezoelectric plate element.

3. An apparatus according to claim 2, wherein said circuit arrangement comprises a first circuit means for producing a first portion of said voltage as said first level variation having a level varying with a predetermined slope during said period in which said rotary magnetic head means scans the magnetic tape and a second circuit means for producing a second portion of said voltage as said second level variation having a level varying initially with a steep slope, relative to said predetermined slope, for said time duration corresponding to said period of said resonant frequency of said head supporting means and subsequently with a gentle slope, relative to said steep slope, during a remainder of said period in which said rotary magnetic head means is not in contact with the magnetic tape.

4. An apparatus according to claim 3, wherein said circuit arrangement further comprises a driving circuit for supplying said first and second portions of the voltage to said compound piezoelectric plate element.

5. An apparatus according to claim 3, wherein said first circuit means comprises a first current generating circuit and an integrating circuit connected to an output end of said first current generating circuit for producing said first portion of the voltage in response to a current from said first current generating circuit, and said second circuit means comprises a second current generating circuit and having said integrating circuit connected to an output thereof for producing said second portion of the voltage in response to a current from said second current generating circuit.

6. An apparatus according to claim 5, wherein said second current generating circuit comprises at least one variable resistive circuit for producing a current having a first amount and then a current having a second amount less than the first amount during the period in which said rotary magnetic head means is not in contact with the magnetic tape.

7. An apparatus according to claim 6, wherein said variable resistive circuit comprises variable resistant means and switching means operative to step up the resistant value of said variable resistant means in the period in which said rotary magnetic head means is not in contact with the magnetic tape.

8. An apparatus according to claim 3, in which said circuit arrangement comprises means for dividing said period in which said rotary magnetic head means is not in contact with the magnetic tape into first and second sub-periods, said first sub-period having said time duration and being greater than said second sub-period and corresponding to said steep slope level variation.

9. An apparatus according to claim 8, wherein said means for dividing comprises first and second monostable multivibrators receiving a reference synchronous signal derived from said rotatable means for providing respective first and second pulsed signals defining said first and second sub-periods, said first sub-period having said time duration corresponding to said period of said resonant frequency of said head supporting means.

10. Apparatus for controlling the position of a rotary head in a system for reproducing a video signal in which the video signal is recorded in slant tracks on a magnetic tape of the kind including a rotatable element for rotating the rotary head to cause the head to scan the magnetic tape intermittently along an oblique track thereon and a head supporting element attached to the rotatable means for supporting the rotary magnetic head to rotate in accordance with rotation of the rotatable means, said head supporting element being operative to cause a positional shift of said rotary head in a direction of an axis of rotation thereof and having a known resonant frequency that causes swinging movements upon changes in slope of a control signal fed thereto, said apparatus comprising means for generating said control signal for controlling said head supporting element to control the position of said head relative to said tracks, said control signal being in the form of a periodic sawtooth waveform having first, second, and third portions of varying level, and including means for providing said first portion having a constant predetermined slope and said second portion having a substantially steeper slope relative to said predetermined slope for a time duration selected in response to said known resonant frequency and being less than a period in which said rotary magnetic head is not in contact with the magnetic tape and said third portion having a gradual slope relative to said steeper slope during a remainder of the period in which said rotary magnetic head is not in contact with the magnetic tape.

* * * * *